United States Patent

[11] 3,583,528

| | | |
|---|---|---|
| [72] | Inventor | Jean H. De Beukelaer<br>Meudon LaForet, France |
| [21] | Appl. No. | 865,127 |
| [22] | Filed | Oct. 9, 1969 |
| [45] | Patented | June 8, 1971 |
| [73] | Assignee | Auto Research Corporation<br>Boonton, N.J. |

[54] CYCLIC PUMPING SYSTEM MALFUNCTION INDICATOR
7 Claims, 1 Drawing Fig.

[52] U.S. Cl. .................................................. 184/6,
200/81.9, 340/270
[51] Int. Cl. ..................................................... F01m 1/20
[50] Field of Search .......................................... 340/270;
184/1 (C), 6 (D); 200/60.04, 81.9

[56] References Cited
UNITED STATES PATENTS

| | | | |
|---|---|---|---|
| 2,523,666 | 9/1950 | Moth .......................... | 200/81.9X |
| 2,773,251 | 12/1956 | Snyder ........................ | 200/81.9X |
| 2,857,491 | 10/1958 | Harter ........................ | 184/6X |
| 2,934,861 | 5/1960 | Engel .......................... | 184/6X |
| 3,127,954 | 4/1964 | Callahan et al. .............. | 340/270X |
| 3,432,004 | 3/1969 | Lyth ........................... | 184/6 |
| 3,477,545 | 11/1969 | Durnan ........................ | 184/6 |

Primary Examiner—Manuel A. Antonakas
Attorney—Ostrolenk, Faber, Gerb & Soffen

ABSTRACT: In a fluid, e.g. liquid, distribution system having a cyclic pump which periodically pumps fluid to distributing devices, a malfunction indicator to sense an under pressure in the system due either to a malfunction in the pump or to a break in the system; the malfunction indicator includes a pressure-sensing switch connected into the system through a one-way flow valve which permits each pulse of system pressure to act upon the pressure-sensing switch; a slow-bleed device connected between the one-way valve and the pressure-sensing switch to slowly bleed the builtup pressure away from the pressure-sensing switch; when pressure is bled off to a sufficient extent, the pressure-sensing switch shifts and indicates an under pressure in the system; the bleed device bleeds sufficiently slowly so that if the pump operates properly and there is no break in the system, the periodic surges of fluid pressure to the pressure-sensing switch will always keep the switch at the position indicating proper system function; and it is only when there is insufficient pressure in the system, that the pressure-sensing switch will indicate malfunction.

PATENTED JUN 8 1971
3,583,528
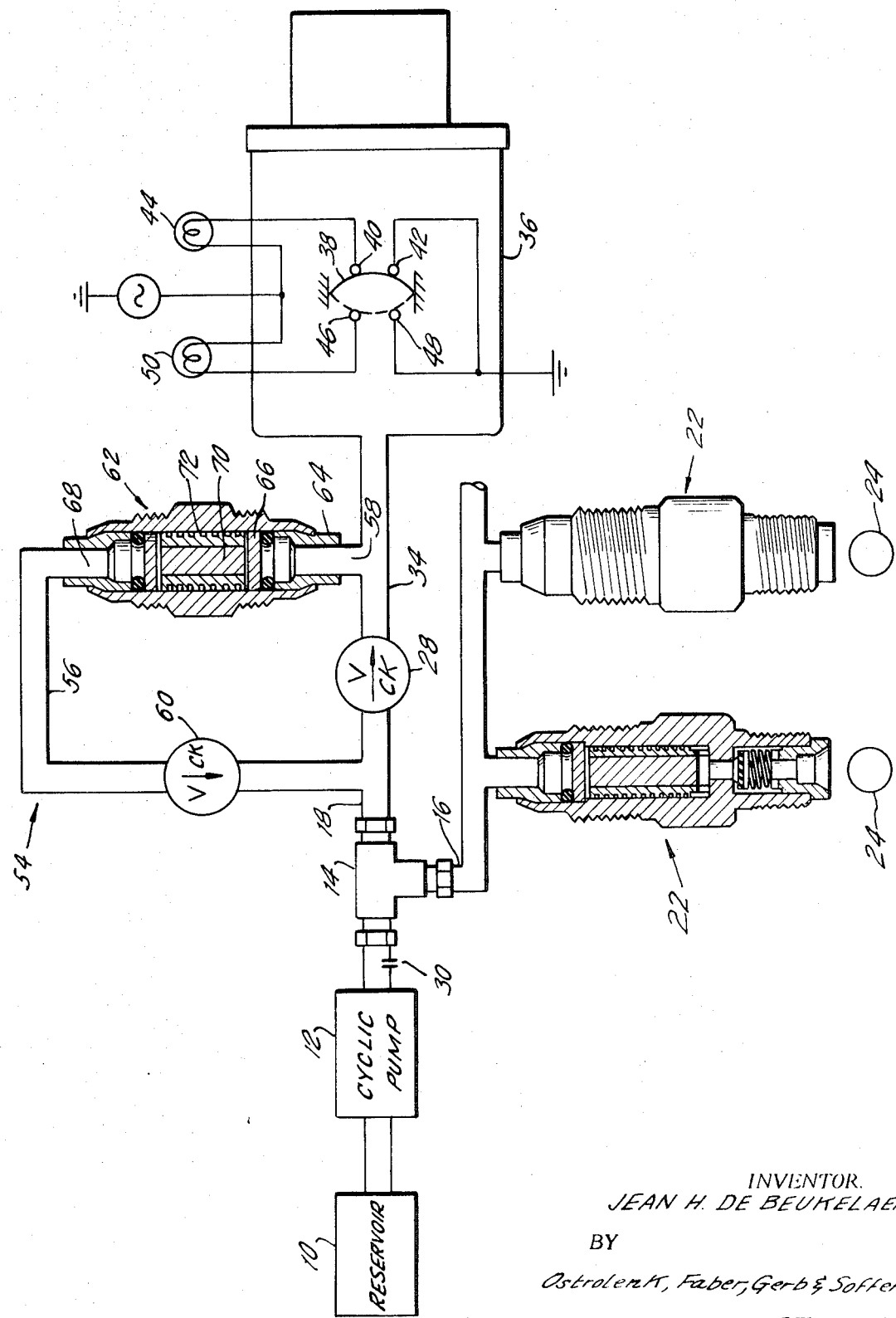
INVENTOR.
JEAN H. DE BEUKELAER
BY
Ostrolenk, Faber, Gerb & Soffen
ATTORNEYS

CYCLIC PUMPING SYSTEM MALFUNCTION INDICATOR

This invention relates to a fluid-pumping apparatus, and more particularly, to a cyclic fluid-pumping system malfunction indicator. While the present invention is useful in conjunction with liquid-pumping, gas-pumping and fluid-pumping apparatus in general, it will be specifically described in conjunction with liquid pumping. However, the invention is not limited to liquids.

Liquid is frequently pumped from a reservoir to receiving means therefor. For example, in the lubrication field, liquid lubricant is pumped from a reservoir through a conduit system to distributing means which distribute the liquid lubricant to bearings and points requiring lubrication.

Where the quantity of liquid required by the means receiving it during any period of time is relatively small, instead of a small flow of liquid being continuously pumped, a larger volume of liquid may be pumped periodically. In some other situations, liquid may only be required periodically, rather than continuously. For example, in many lubrication systems, it is necessary to provide a charge of lubricant to bearings and points requiring lubricant only at widely spaced time intervals.

It is frequently desirable that liquid-dispensing apparatus be capable of automatic operation for prolonged periods of time without having to be checked for proper operation. If a discharge of liquid, e.g. lubricant, is periodically required, and if, due to mechanical failure, the quantity of liquid discharged is insufficient or discharge fails to occur, there could be damage to equipment being serviced by the liquid being discharged. For example, bearings which are not properly lubricated may dangerously heat up, stick, prematurely wear out, or be otherwise damaged. Consequently, various systems have been devised to ascertain whether automatically operating liquid-dispensing apparatus is operating properly or is malfunctioning. A conventional sensing device for determining whether there has been a malfunction is comprised of a pressure-sensing device which senses system pressure after each periodic pulse of liquid pressure. The pressure-sensing device is always coupled with a timing device for measuring the time that elapses between periodic pulses of liquid pressure, so that if a pulse of liquid at the correct pressure is not sensed within a predetermined period of time, e.g. the interval between two periodic pumping operations, an indication will be given that a malfunction has occurred. The pressure-sensing device is frequently associated with a recycling device for recycling the pressure-sensing device to the condition where it is prepared to again sense the next pulse of liquid pressure. An indicator device is connected with the pressure-sensing device to indicate when the pressure-sensing device has responded to an underpressure due to a malfunction in the system. Such prior art systems are expensive because they require a pressure-sensing device, a complex and expensive timer and a complex and expensive recycling means.

Typical examples of the above-described prior art malfunction-sensing apparatus appear in U.S. Pat. Nos. 3,223,108 and 2,399,171 and in copending application Ser. No. 754,050, filed Aug. 20, 1968, by Robert H. Jaggi, entitled "Central Lubricating System of the Sequentially Operating Piston-Valve Type" and assigned to the assignee hereof.

The present invention provides a simplified malfunction indicator which does not require any complex mechanical timing device or recycling means associated with a pressure-sensing device. Thus, unnecessary expense and complexity are prevented, while continuous accuracy and proper operation of the cyclic pumping system malfunction indicator is guaranteed.

In accordance with the present invention, which may be used in conjunction with any fluid, but which is specifically described in conjunction with liquid, a liquid pressure-sensing switch is connected into the liquid distribution system through a one-way flow valve which permits liquid and system pressure to flow to the pressure-sensing switch, but not back into the system from the switch. Thus, when there is a pulse of liquid pressure due to periodic operation of the pump, the pressure pulse passes the one-way check valve and impinges on the pressure-sensing switch, registering that all is well in the system.

When the pump halts its operation between periodic pulses, system pressure will decline due to some of the liquid in the system having been dispensed from the system, due to expected leaks in the system, and due, perhaps, to a bleedoff or pressure-reduction means especially provided for the system.

A separate pressure bleedoff device has its inlet between the one-way valve and the pressure-sensing switch, whereby the pressure built up between these two elements due to periodic operation of the pump is slowly bled off through the bleedoff device. The pressure bled off may be returned to the system or to waste. The bleedoff device must be connected, however, to lower pressure than the pressure between the one-way valve and the pressure-sensing switch. The bleedoff device may include means for bleeding pressure directly through the one-way check valve, or preferably includes a separate conduit having its inlet connected as aforesaid and its outlet connected, as desired, to waste or back into the system.

A flow control means is included in the bleedoff device to cause pressure to be bled off at the correct rate. The flow control means may comprise a conventional liquid flow control fitting with a bore therethrough having a length and cross-sectional area so chosen as to properly control the rate of liquid flow.

The pressure-sensing switch shifts between two operative positions, viz. a first position where it is under the influence of elevated pressure above a predetermined level, and thus causes an indicating device to indicate that the system is operating properly; and a second position where it is under the influence of reduced pressure below the predetermined level, and thus causes an indicating device to indicate that there is insufficient pressure in the system and that there, therefore, is a malfunction in the system.

The flow control unit in the bleedoff device is chosen so that bleedoff is at a rate which is sufficiently slow that so long as the pump properly periodically sends an adequate charge of liquid pressure into the system and there is no break in the system, the system pressure will not be reduced below the predetermined level and the pressure switch will never shift from its first to its second operative position. It is only when the pump malfunctions or there is a break in the system and insufficient pressure passes the one-way check valve to impinge upon the pressure-sensing switch that the bleedoff device will reduce the pressure on the pressure-sensing switch to a level that will permit that switch to shift from its first to its second operative position, thereby causing the malfunction indicator to indicate that the system is malfunctioning.

Accordingly, it is a primary object of the present invention to provide a malfunction indicator for a cyclic pumping system.

It is another object of the present invention to provide such an indicator which is less complex and expensive than conventional indicators.

It is a further object of the present invention to provide such an indicator which has no need for a mechanical timing device.

It is yet another object of the present invention to provide such an indicator which employs a pressure-sensing device without requiring a special means for recycling the pressure-sensing device following each periodic surge of liquid pressure in the system.

These and other objects of the present invention will become apparent from the following description of the accompanying drawing which illustrates, partially schematically, a preferred form of malfunction indicator designed in accordance with the present invention and situated in a liquid distribution system.

The malfunction indicator of the present invention may be used as part of a liquid distribution system shown in the two above-mentioned patents and the above-noted pending application.

The system specifically schematically illustrated in the drawing includes a conventional reservoir 10, e.g. a barrel, of liquid to be pumped. A conventional cyclic pump 12, connected with reservoir 10, pumps liquid out of it. See, for an example of a cyclic pump, U.S. Pat. No. 2,710,670, issued on June 14, 1955 to Thomas R. Thomas, entitled "Lubricant Pump" and assigned to the assignee hereof.

Liquid pumped by pump 12 passes into the system to be dispensed where required. The liquid passes through T-joint 14 and is there divided between conduits 16 and 18, with the bulk of the liquid entering system conduit 16. Conduit 18 leads to the indicator of the present invention.

Connected directly to main system conduit 16, or to conduit 16 through conventional branch conduits (not shown), are conventional one-way flow, high restriction, flow metering fittings 22, like that shown in U.S. Pat. No. 2,992,659, issued on July 18, 1961 to Thomas R. Thomas, entitled "High Restriction Metering Unit," and assigned to the assignee hereof. Each fitting 22 is associated with a bearing or other point 24 and is so positioned with respect to its respective bearing or point that liquid passing through fitting 22 when there is a surge of liquid pressure is dispensed to the bearing or point.

When pump 12 operates, there is a surge of pressure in the system which raises the pressure in both conduit 16 and conduit 18. The elevated pressure in conduit 16 causes liquid to be dispensed.

The elevated pressure in conduit 18 and a small quantity of the liquid itself within conduit 18 is forced past conventional one-way check valve 28. This valve permits flow of liquid and pressure only away from pump 12 and out of the system, and prohibits flow back toward pump 12 and into the system. One-way valve 28 is normally biased closed, e.g. by a spring (not shown) which has sufficient force to prevent opening of the valve for forward flow until pressure in the system is elevated due to operation of pump 12.

It is to be understood that, between each periodic operation of pump 12, there is residual pressure in the system from each preceding pump operation. It is desirable, when only residual pressure is present, that valve 28 be closed to permit proper operation of the malfunction indicator, as more fully described below. The conventional spring bias in valve 28 assures this. It is only when the pressure builds up due to operation of pump 12 that valve 28 opens.

A conventional bleed 30 may be associated with the system to reduce the residual system pressure between periodic operations of pump 12.

A conduit 34 joins one-way valve 28 with a conventional pressure-sensing switch 36, which may be of a type well known in the art. For example, switch 36 includes a resilient conductive element 38 which is fixedly supported at its ends within the body of switch 36. Switch 36 has two operative positions. It assumes the first (with element 38 in its solid line position) under the influence of elevated system pressure impinging upon the switch when the system is operating properly, and assumes (e.g. by being normally so biased) the second (with element 38 in its invisible line position) when there is insufficient system pressure. At the second position, the switch causes the malfunction indicator to indicate that there is a malfunction in the system.

Elevated pressure in conduit 34 impinges upon flexible conductive element 38 and forces it to its first position, thereby closing the circuit between contacts 40 and 42. This causes indicator 44 to indicate that the system is operating properly. Should the pressure within conduit 34 that impinges upon element 38 decrease below a predetermined level, resilient element 38 would naturally shift to its second position, thereby breaking the circuit between contacts 40 and 42 and closing the circuit between contacts 46 and 48. This would cause indicator 50 to indicate that pressure in conduit 34 has decreased below a predetermined level which, in turn, would indicate that there is a malfunction in the system.

Each time there is a surge of pressure in the system, due to operation of pump 12, the pressure in conduit 34 is elevated. Since valve 28 is a one-way valve, pressure in conduit 34 would not normally be reduced to cause the pressure-sensing switch 36 to indicate that there is a malfunction in the system. Accordingly, a controlled bleedoff device 54 is connected to the conduit 34, between valve 28 and pressure-sensing switch 36, to gradually bleed off elevated pressure. If sufficient pressure is bled off, switch 36 will shift to its second position and indicate a malfunction.

So long as cyclic pump 12 operates properly and at the desired frequency, and so long as there are no breaks or other malfunctions in the system, the pressure in conduit 34 will be periodically elevated, and the controlled bleedoff device 54 will never have the opportunity to bleed enough pressure away from pressure-sensing switch 36 to cause the switch to shift to its second position and indicate there is a malfunction in the system. If, however, the cyclic pump fails to operate properly, or to operate at all, or fails to send a sufficient surge of pressure into the system, or if there is a break in the system, or if some or all of the high restriction outlet fittings 22 fail to properly operate and there is insufficient system pressure developed, there will also be insufficient pressure developed within conduit 34, and the pressure bleedoff device 54 will bleed off so much pressure between pulses of pump 12 that switch 36 will move to its second position and indicate that there is a malfunction in the system. Accordingly, the flow control rate of the pressure bleedoff device is chosen such that pressure is bled off sufficiently slowly that if the pump and system are operating properly, no malfunction will be indicated in the system, and sufficiently rapidly that in the event that there is a malfunction in the system, the malfunction indicator will indicate the presence of the malfunction as rapidly as possible.

Bleedoff device 54 includes a flow conduit 56 whose inlet 58 is connected to conduit 34 between one-way valve 28 and pressure switch 36. At the option of the designer, conduit 56 may be provided with a one-way check valve 60 of its own, which ensures that flow through the conduit is only in the bleedoff direction and that there is no flow through the conduit in the forward direction due to operation of pump 12. It is not essential, however, to block forward flow, and where it is not critical, forward flow need not be blocked.

The rate of bleedoff through conduit 56 is controlled by a conventional flow control fitting 62, having an inlet 64 leading to a central chamber 66 which then leads to the fitting outlet 68. Within central chamber 66 is flow control insert 70, which is comprised of an enclosed cylinder having a spiral groove wound about its periphery, which groove leads from the inlet to the outlet of the chamber 66. A spiral passageway 72 for liquid is defined by the spiral groove in element 70 contacting the interior wall of chamber 66. The length and cross-sectional area of spiral passageway 72 are chosen so as to closely control the rate of flow of a liquid having a particular viscosity. If either the rate of flow through fitting 62 or the viscosity of the liquid passing through fitting 62 is to be changed, then the length and cross-sectional area of passageway 72 would be appropriately altered so that the flow rate of liquid under pressure through passageway 72 would be proper.

Bleedoff device 54 is chosen so that it bleeds off liquid and pressure in conduit 34 sufficiently slowly that the pressure in conduit 34 does not reduce beneath the level at which the switch element 38 would move from its first to its second position before the next periodic operation of pump 12. Operation of pump 12 again sends a surge of liquid at elevated pressure into conduit 34, thereby ensuring that switch element 38 remains securely in its first position. Bleedoff device 54 can bleed off pressure sufficiently slowly that it requires one missed cycle by pump 12 or two missed cycles or three, etc., before the pressure in conduit 34 drops to a level which causes malfunction indicator 50 to indicate there is a malfunction.

Conduit 56 is shown as being connected back into the liquid-pumping system upstream of the one-way check valve 28, e.g. into conduit 18. Conduit 56 may, in the alternative, be permitted to empty outside the liquid-pumping system, e.g. to waste or back into the reservoir to be repumped. It is only necessary that the outlet from conduit 56 be connected to a pressure sufficiently below the pressure at inlet 58 to conduit 56 that there will be the desired bleedoff through bleedoff device 54.

In operation, when pump 12 periodically operates, liquid is pumped through conduits 16 and 18. The liquid through conduit 16 passes to high restriction outlet fittings 22 where it is dispensed to means 24 to receive the liquid. The liquid under pressure in conduit 18 passes through one-way check valve 28 into conduit 34, and the pressure reacts upon element 38 within the pressure-sensing switch 36. Element 38 is shifted to its first position, where it closes the circuit between contacts 40, 42 and thereby causes indicator 44 to indicate that there is no malfunction in the system.

The liquid under elevated pressure trapped in conduit 34 between valve 28 and switch 36 is gradually bled off through bleedoff device 54.

In the event that the pump misses a cycle, or there is a break somewhere in the system, e.g. one of the high restriction fittings is defective and is allowing excessive liquid to pass through or there is a break in the conduit, the pressure within conduit 34 will not be elevated sufficiently to keep the switch element in its first position until the next operation, if any, of the pump, because the pressure in conduit 34 is being continuously bled off by bleedoff device 54. Switch 36 will then shift to its second position, and a malfunction will be indicated.

There has just been described a novel malfunction indicator for a cyclic fluid-pumping system, which indicator is simple to construct, which does not require complex mechanical timing and recycling devices, and which employs a pressure-sensing switch connected into the fluid-pumping system through a one-way valve, with a slow fluid and pressure bleedoff device being connected between the one-way valve and the pressure-sensing switch to slowly bleed off the pressure built up at the pressure-sensing switch after each operation of the cyclic pump, wherein the indicator will indicate that there has been a malfunction in the system when the pressure at the pressure-sensing switch is at a reduced level, due to pressure having been bled off by the bleedoff device without a sufficient surge of pressure having thereafter been provided by a cycle of pump operation.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

I claim:

1. In a fluid distribution system including
a supply of fluid to be distributed;
a cyclically operable pump which automatically operates at a predetermined pumping frequency; said pump being connected with said fluid supply to periodically pump fluid therefrom through said system;
said system including fluid distributing fittings connected with said pump through which fittings fluid is pumped for distribution out of said system; said system including means for causing the pressure in said system to increase as said pump operates and to decrease between pump operations;
a cyclic pumping system malfunction indicator connected into said system to sense the pressure in said system resulting from fluid being pumped by said pump and to sense that the cyclic system pressure is below a predetermined level which indicates that there is a malfunction in the system; and a malfunction indication device connected with said indicator for indicating that there is a malfunction in said system;
the improvement comprising,
said malfunction indicator comprising,
a pressure-sensing switch; said switch being movable to a first position when system pressure above a predetermined level is applied to it and to a second position when system pressure below said predetermined level is applied to it; at said second position, said switch being adapted to cause operation of said malfunction indication device;
a one-way valve connected between said switch and said system for permitting system pressure above said predetermined level to pass to said switch, thereby shifting said switch to its said first position, while blocking the return of the pressure on said switch back into said system when system pressure decreases between pump operations;
and pressure bleed means connected with said switch for bleeding pressure away from said switch at a predetermined rate after the pressure applied to said switch has been elevated due to operation of said pump; said bleed means being designed so that said predetermined bleed rate is sufficiently slow that the pressure within said system between pump operation cycles will be above the said predetermined level which would cause said pressure switch to shift to its second position, unless there is a malfunction in the system and system pressure above said predetermined level is not attained.

2. In the fluid distribution system of claim 1, the improvement further comprising,
said bleed means being connected back into said system, whereby pressure on said switch is bled back into said system between pump operations, 3. In the fluid distribution system of claim 1, the improvement further comprising,
said bleed means being connected in parallel with said valve and said bleed means having an inlet which is connected between said valve and said switch.

4. In the fluid distribution system of claim 3, the improvement further comprising,
said bleed means comprising a conduit having a flow rate control fitting connected therein, which fitting is chosen so as to permit flow therethrough only at said predetermined rate.

5. In the fluid distribution system of claim 4, the improvement further comprising,
said bleed means being connected back into said system, whereby pressure on said switch is bled back into said system between pump operations.

6. The fluid distribution system of claim 5, wherein the fluid which is distributed is a liquid.

7. The fluid distribution system of claim 5, wherein the liquid which is distributed is a liquid lubricant.